Aug. 15, 1944.   P. F. SHARP   2,355,683
CHECK VALVE
Original Filed April 9, 1942
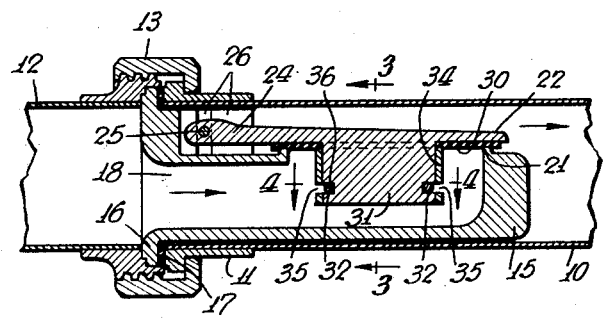
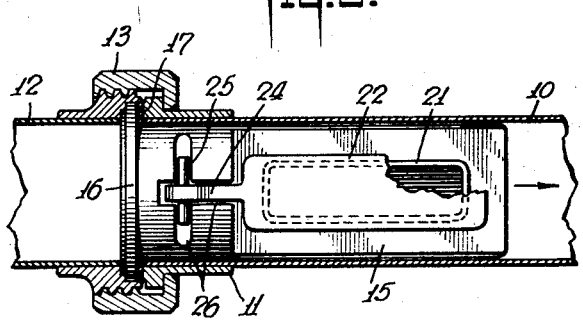
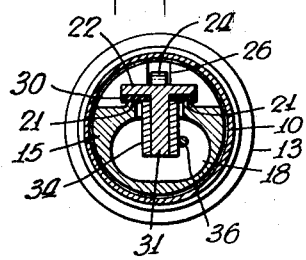
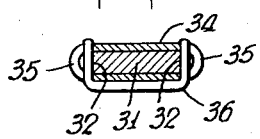
INVENTOR
*Paul F. Sharp*
BY
*Dean Fairbank & Hirsch*
ATTORNEYS Patented Aug. 15, 1944

2,355,683

UNITED STATES PATENT OFFICE 2,355,683

CHECK VALVE

Paul F. Sharp, Ithaca, N. Y., assignor to Cornell Research Foundation, Inc., Ithaca, N. Y., a corporation of New York Original application April 9, 1942, Serial No. 438,216. Divided and this application April 21, 1942, Serial No. 439,837

6 Claims. (Cl. 251—123)

This application is a division of copending application Serial No. 438,216, filed April 9, 1942, and relates to a check valve which, while capable of wide utility, is especially useful in connection with liquid food piping or treating systems. The check valve may, for example, be employed in connection with a system in which liquid foods, such as milk, fruit juices, tomato juice and the like are deaerated in a chamber for the purpose of preserving certain desirable qualities therein. A check valve of the present type may be used in a horizontal or substantially horizontal position in the pipe line from the outlet of this chamber to prevent return flow of the deaerated liquid or air leakage back into said chamber.

One object of the present invention is to provide a liquid check valve which is comparatively simple and inexpensive to manufacture, which can be easily mounted in the ordinary liquid pipe line with a minimum number of fittings, which is absolutely liquid-tight against return flow, and which can be easily and expeditiously disassembled to render its parts accessible for cleaning according to the strictest sanitary requirements of the dairy or other liquid food industries.

Various other objects, features and advantages of the invention will be apparent from the following description, and from an inspection of the accompanying drawing, in which Fig. 1 is a vertical section of part of a liquid piping system, and shows a form of check valve therein constituting an embodiment of the present invention;

Fig. 2 is a plan view partly in section of the construction shown in Fig. 1; and Figs. 3 and 4 are sections taken on lines 3—3 and 4—4 of Fig. 1.

In the specific form shown in the drawing, the improved valve is mounted in a horizontal part of a piping system for handling a liquid, especially liquid food. This system, for instance, may be similar to that shown in copending application Serial No. 438,216 employed for deaerating milk, and may include a constant speed pump for drawing off deaerated milk from a deaerator chamber under vacuum, and delivering it for further processing, as for instance, through a series of pasteurizing, cooling and other units to a bottling station or other packaging or storage point. The check valve of the present invention is mounted between the outlet of the deaerator chamber and the pump to insure against leakage of air back into said chamber, and to prevent said pump from losing its prime.

In the piping system shown, one of the horizontal pipe sections 10 leads to the pump, and is shown provided with a flanged collar 11 fixed to one end thereof, as for example by welding or soldering. The other horizontal pipe section 12 leads from the outlet of the deaerator chamber and is removably joined to the pipe section 10 by a collar 13.

The check valve includes a valve seat member 15 shown in the form of an elongated block removably extending into the horizontal pipe line 10 from one end thereof, and formed with an annular flange 16 at one end bearing against the flange of the collar 11 through an intervening gasket 17. A recess 18 shown of substantially elliptical cross-section in the seat member 15 forms an inlet passage for the liquid in its flow towards the pipe 10. This seat member 15 has a raised rim seat 21 shown in the shape of a substantially oblong rectangle extending lengthwise of the pipe line 10. Seated on this rim seat 21 is a flap or clack valve comprising a tongue 22 of substantially oblong rectangular shape having a shank 24. Extending transversely through this shank 24 is a pin 25 forming a cross-head. For loosely receiving this cross-head, the seat member 15 is formed beyond one end of the rim seat 21 with a cross-shaped recess 26 open at its upper side to permit the cross-head 24, 25 and tongue 22 to be easily slipped into or out of said recess. The bottom of this cross-section 26 extends below the rim seat 21, so that the flap valve can move vertically as well as angularly.

The flap valve is weighted to assure proper seating of the valve, and is provided with a gasket 30 of resilient material, such as rubber, to assure an absolute tight closure fit. To detachably retain this gasket 30 in position, and to weight the flap valve, the valve tongue 22 has a depending flange 31 of substantially oblong cross-section formed with a pair of notches 32 at the ends thereof. The gasket 30 is formed with an oblong aperture snugly receiving the flange 31, and is held in place by a metal band or sleeve 34 snugly telescoped over the flange 31. This sleeve 34 is formed with a pair of slots 35 at the ends thereof registering with the notches 32, and a U-shaped spring clip 36 is inserted through the registering notches 32 and slots 35.

The check valve shown can be installed in an ordinary horizontal liquid pipe line, and requires no additional union or coupling. The nut which ordinarily joins two pipes together is sufficiently long to make the connection and at the same time hold the check valve in position. Thus no additional nut or ferrule is required.

The flap valve may move up and down, although this movement may deviate slightly from the vertical positioning due to its loose hinged connection, so that the proper gravitational seating of the flap valve on the seat 21 is effected and an absolutely tight fit is assured. Furthermore, this check valve is free from threaded parts and inaccessible holes or recesses, and can be easily disassembled for cleaning and inspection, so that it meets all the sanitary requirements of the dairy or other liquid food industries.

Although the flap valve 22 is shown with a cross-head 24, 25 and the seat member 15 has a correspondingly shaped recess 26, as far as certain aspects of the invention are concerned this recess and the shank of the flap valve may be formed in any other suitable manner capable of affording a relatively loose and readily detachable slip-on and slip-off connection between the flap valve and the valve seat member.

As many changes can be made in the above apparatus, and many apparently widely different embodiments of this invention can be made without departing from the scope of the claims, it is intended that all matter contained in the above description or shown in the accompanying drawing shall be interpreted as illustrative and not in a limiting sense.

What is claimed is:

1. A check valve comprising a valve seat member having a substantially horizontal seat, and a valve passage below said seat, a flap valve having a tongue and a flange depending from the underside of said tongue, means guiding said flap valve for vertical and angular movement on said valve seat member and having a slip-on and slip-off connection with said valve seat member, a band for weighting said tongue telescoped over said flange, said flange and said band having registering notches, and a U-shaped spring clip extending into said registering notches for detachably retaining said band onto said flange.

2. A check valve comprising a valve seat member having a substantially horizontal seat and a cross-shaped guide recess extending downwardly from its upper side and open at its upper end, and a flap valve having a tongue adapted to be seated on said seat, and having at one end a cross-head loosely fitted in said guide recess, said cross-head being adapted to be slipped in or out of said recess through said upper open end, said flap valve also having a flange depending from the underside of said tongue, a gasket slipped over said flange and extending across the seating section of said tongue, a sleeve telescoped over said flange and against said gasket, and a spring clip detachably retaining said sleeve and gasket on said flange.

3. In combination, a pair of horizontal pipe sections, a collar connecting them together, a check valve permitting liquid flow through said pipe sections only in one direction, and comprising a valve seat member having a flange held in place between the ends of said pipe sections, and a body portion extending into one of said pipe sections and having a substantially horizontal seat provided with a flow opening therethrough, a flap valve guided for vertical and angular movement in respect to said seat, a flange depending from the underside thereof, a gasket slipped over said flange for engagement with said seat, a sleeve telescoped over said flange and against said gasket, and a spring clip detachably retaining said sleeve on said flange.

4. A check valve comprising a valve seat member having a substantially horizontal seat and a valve passage below said seat, a flap valve having a tongue and a flange depending from the underside of said tongue, means guiding said flap valve for vertical and angular movement on said valve seat member, a sleeve for weighting said tongue telescoped over said flange, said flange and said sleeve having registering notches, and a U-shaped spring clip extending into said registering notches for detachably retaining said sleeve on said flange.

5. A check valve comprising a valve seat member adapted to be extended into the end of a pipe and having a substantially horizontal seat provided with a vertical passage therethrough elongated in the direction of the length of the pipe and of a cross-sectional area approximating that of said pipe, said seat member also having in its upper side a cross-shaped substantially vertically extending open-top guide recess, a flap valve adapted to be seated on said seat and having at one end a cross-head loosely fitted in said guide recess, said cross-head being adapted to be slipped in or out of said recess through said open top thereof, said flap valve also having a flange extending lengthwise thereof and depending from the underside thereof, a gasket having a slot receiving said flange and extending across the seating section of said valve, and a member adapted for slip-on and slip-off engagement with said flange below said gasket for holding the latter in position against the underside of said valve.

6. In combination, a pair of horizontal pipe sections, a collar connecting them together, a check valve permitting liquid flow through said pipe sections only in one direction, and comprising a valve seat member having a flange held in place between the ends of said pipe sections and a body portion extending into one of said pipe sections, which body portion has a substantially horizontal seat provided with a flow opening therethrough extending in the direction of the length of said pipe sections, a flap valve guided for vertical and angular movement in respect to said seat, a flange depending from the underside of said flap valve and extending lengthwise of said opening, a gasket slipped over said flange for engagement with said seat, a sleeve telescoped over said flange and against said gasket, and means having quick-detachable connection with said flange for removably retaining said sleeve on said flange.

PAUL F. SHARP.